United States Patent Office 2,777,752
Patented Jan. 15, 1957

2,777,752

RECOVERY OF CADMIUM AS SULPHATE FROM CADMIUM OXIDE CONTAINING DUSTS

Robert E. Lund, Rochester, and Don E. Warnes, Monaca, Pa., assignors to St. Joseph Lead Company, New York, N. Y., a corporation of New York No Drawing. Application November 10, 1953, Serial No. 391,384

6 Claims. (Cl. 23—117)

This invention relates to improvements in the beneficiation of cadmium-containing dusts. The invention is directed more specifically to the recovery of cadmium from cadmium-containing dusts of the type recovered from the fume-laden gas produced by sintering zinciferous ores.

In the pyrometallurgy of zinc, it is almost the universal practice to agglomerate and purify the zinciferous material charged to the reduction furnaces by sintering. The sintering operation is usually carried out on traveling grate machines of the well-known Dwight-Lloyd type. The principal zinciferous material entering the charge placed on the sintering machine is usually previously roasted zinc sulfide concentrates. In one modification of sintering practice, the operations of roasting and sintering are combined in one step by feeding green ore directly to the sintering machine. Certain other modifications are well-known in the art, such as the incorporation in the sinter mix of various modifying ingredients such as silica sand or various other binders, together with the inclusion of sufficient amount of extraneous fuel as is necessary to carry out the sintering reaction.

Whatever the particular mixture be that is charged to the sintering machines, there results from the sintering operation a fume-laden gas containing the volatilized constituents from the sinter charge. Prominent among the components of the fume in the gas from the windboxes are various compounds of the elements zinc, lead, cadmium, and sulfur. Some of the sulfur will be found associated with a portion of the zinc as $ZnSO_4$. Inasmuch as the amount of zinc carried away by the sintering machine gases may comprise from 2% to 5% of the weight of zinc charged to the sintering machine, it is economically desirable to remove and recover the metal fume from the sintering machine gases. Such recovery is usually achieved either by filtering the fume out in a bag house or by passing the gas through a Cottrell-type electrostatic precipitator wherein the fume is separated from the gas and collected for conveyance to recovery means.

The methods of recovering cadmium from sinter machine fume up to the discovery of the invention herein disclosed fall into four principal categories. In one general method, the fume is treated with solutions of sulfuric acid which converts the zinc and cadmium content to soluble zinc and cadmium sulfates and leaves an insoluble lead sulfate residue. Cadmium is recovered from the sulfate solution by suitable means, such as cementation with zinc, usually in the form of zinc dust. Because of side reactions initiated by various complex sulfur compounds transferred from the dust to the solution and because of other impurities present in the solutions, such as arsenic and other injurious metals, it is often necessary to carry out a double cementation operation in order to produce commercially acceptable cadmium. In those cases where double cementation is not required, the solutions must always be purified prior to cementation. Frequently, purification is required even when double cementation is practiced. Such purification may take one or a combination of several forms. Precipitation of ferric hydroxide, oxidation by means of chemical oxidants, and additions of metallics such as zinc, copper, cadmium, and the like, are examples. The presence of harmful impurities in the solution limits rather severely the recovery of cadmium during the cementation process.

The second category of treatment methods comprises dead-roasting the sinter fume and acid leaching the calcine. This method, while advantageous from the viewpoint of minimizing difficulties with side reactions from complex sulfur compounds, has a number of disadvantages over the method of our invention in that substantial quantities of sulfuric acid are required, an unfavorable cadmium/zinc ratio occurs in the leach solutions, and the solutions must be chemically purified to achieve economical recovery of cadmium.

In the third general category of prior art practice is the method of mixing the bag house or Cottrell fume with an amount of strong sulfuric acid sufficient to make a doughy mass, baking this mass at high temperature, solubilizing the baked material, and water leaching the product. Here again the process consumes substantial amounts of sulfuric acid and produces a solution of relatively low cadmium/zinc ratio. Also, further purification of the solution is usually required prior to cementation.

The fourth general category of the prior art is based upon sulfation of the cadmium resulting from oxidation of elemental or reduced sulfur compounds. Sulfation of the cadmium is achieved by the oxidation of cadmium sulfide to cadmium sulfate and/or by sulfation of cadmium by the sulfurous fumes produced by the burning of sulfur-containing materials. In the latter case, it is necessary that iron-containing material be present to catalyze the oxidation of $SO_2$ generated to form $SO_3$ with the sulfation of cadmium proceeding by the following reaction:

$$CdO + SO_3 \rightarrow CdSO_4$$

In one such process appreciable quantities of iron pyrites (varying from one part of iron pyrite to four parts of dust and from 1½ parts of iron pyrites to one part of dust) are added to flue dust and the mixture is roasted at elevated temperatures. The burning of the labile sulfur and iron sulfide produces sulfurous fumes which sulfate the cadmium. Appreciable portions of any zinc present are sulfated also. This method is desirable in achieving arsenic control but has a number of disadvantages over the method of the invention in that substantial quantities of pyrites are required, appreciable quantities of zinc are sulfated with a correspondingly unfavorable cadmium/zinc ratio in the leach solution, and treatment of leach residue for recovery of zinc and lead is complicated by the high iron content.

In the method of the invention, the disadvantages of the prior methods are eliminated. As will be seen from the description given below, the method does not require the use of substantial supplemental quantities of sulfuric acid, does not require the presence or addition of elemental or reduced sulfur in the material to be treated, does not require the presence or addition of iron-containing sulfate-forming material, produces a sulfate solution upon water leaching containing a high cadmium/zinc ratio, and produces solutions which require no purification for the production of a cadmium product of exceptionally high purity.

It is a purpose of the invention to provide a means for recovering cadmium with no substantial consumption of sulfuric acid. It is another purpose of the invention to provide a method for recovering cadmium by autogenetic sulfation of the cadimum-containing dust so that the cadmium may be recovered by a simple water leach. It is a further purpose of the invention to provide a process to solubilize cadmium selectively and thereby to produce a sulfate solution containing a high cadmium/zinc ratio from raw material of low cadmium/zinc ratio. It is a still further object of the invention to provide a method for the simple direct recovery of cadmium in a single-stage cementation process which does not require purifying the solution prior to cementation. Other objects and purposes of the invention will become apparent from the description given.

The invention is based on the discovery that by a properly controlled heat treatment of bag house or Cottrell dusts of the type heretofore described it is possible to induce autogenetic sulfation of the cadmium. It has been discovered that by heat treating sinter fume containing cadmium in the form of the oxide together with sulfates of zinc or iron or both, in a relatively narrow temperature range it is possible to convert the cadmium content almost entirely to water soluble cadmium sulfate, while at the same time, converting the zinc and iron to water insoluble compounds. It has been found that fumes from the sintering of zinciferous material may be appropriately treated either in batches or continuously to selectively sulfate the cadmium. The selective sulfation is due to the exchange of sulfate between zinc or iron and cadmium according to the following manner:

$$ZnSO_4 + CdO \rightarrow CdSO_4 + ZnO$$

By careful control of temperature, the sulfation of cadmium can be made 90% or more complete. A temperature of at least 400° C. is required to obtain the maximum solubilization of the cadmium. The limiting temperature for the sulfation is the decomposition temperature of zinc sulfate which starts at approximately 700° C. Until the cadmium is sulfated, requiring a time period of approximately one hour, temperatures should be held below 700° C. Normal heat treatment in the range of 500° C. to 600° C. will give a leach product containing ten times as much cadmium as zinc. However, if it is desired to secure a leach product containing even less zinc, temperatures can be thereafter elevated above 700° C. but held below 827° C. (temperature at which $CdSO_4$ starts to decompose) to render the zinc insoluble.

If the fume or other material does not contain sufficient zinc sulfate (together with sulfates of iron, copper and aluminium as may be present) to react with the cadmium oxide in the material additional sulfates may be added to the material for example by admixing zinc sulfate from another source with the material.

The principles of the invention may be illustrated by considering its application to representative sinter plant Cottrell fume; Cottrell fume of the following composition was heat treated for one hour at 500° C. in a gas fired furnace: Zn, 37%; Pb, 9.9%; Cd, 4.8%; sulfate sulfur, 5.5%. In the untreated fume, 15.4% of the contained cadmium is water soluble and 18.3% of the contained zinc is water soluble. Following heat treatment, water soluble cadmium increased to 85% of the contained cadmium while water soluble zinc decreased to 7.1% of the contained zinc.

The heat treated fume had the following composition; Zn, 47%; Pb, 13.2%; Cd, 6.4%; sulfate sulfur, 5.9%. The increased percentage composition of all listed components in the heat treated fume as compared with the untreated fume is due to loss in weight of non-metallic constituents upon heat treatment.

Selective sulfation of the cadmium in the method of the invention is due to sulfate exchange between the zinc and the cadmium whereby the cadmium becomes enriched with sulfate and the zinc depressed of its sulfate. Inasmuch as oxidation of elemental or reduced sulfur compounds plays no part in the reaction, it is not necessary that the heat treatment be carried out under the strongly oxidizing conditions which are necessary when cadmium sulfates are obtained by the oxidation of sulfur containing materials.

One of the important and outstanding characteristics of the process of the invention is the very low concentration of the impurities in the cadmium solutions obtained. Metals such as copper, iron, and aluminum, which may be present in small amounts in the fume to be treated, will transfer their sulfate ions selectively to cadmium in the same manner as does zinc. Accordingly, such impurities are rendered insoluble in the process of heat treatment. Any arsenic present is also rendered insoluble. The resulting cadmium solutions are of such exceptional purity that no purification prior to cadmium recovery is required. A typical cadmium solution containing 40 grams per liter of cadmium obtained by the method of the invention has the following impurity content:

| Metal | Concentration |
|---|---|
| Zn | 4.09 g./l. |
| Pb | less than 0.05 g./l. |
| As | less than 1 mg./l. |
| Fe | 0.05 g./l. |
| Mn | less than 0.20 g./l. |
| Cu | less than 0.02 g./l. |

Typical analyses of raw fume and fume heat treated according to the practice of the invention are:

| | Percent Pb | Percent Cd | Percent Zn | Percent Fe | Percent As | Percent Total Sulfur | Percent Sulfate Sulfur |
|---|---|---|---|---|---|---|---|
| Raw Fume | 10.2 | 6.7 | 35.7 | 2.3 | 0.44 | 9.7 | 4.1 |
| Heat-treated fume | 13.9 | 8.5 | 46.0 | 3.1 | 0.56 | 4.4 | 4.2 |

Loss of weight upon heat treating amounts to about 25%, which is due to volatilization of water of hydration and other non-metallic constituents.

The following examples are illustrative of the principles of the invention:

*Example I*

In an eight-hearth furnace (21'6" diameter of the well-known Nicholas-Herreshoff furnace design) sinter plant Cottrell fume was fed at the rate of 14.6 tons per day. Composition of the raw fume was 19.7% lead, 8.2% cadmium, 27% zinc, 12.6% total sulfur, and 4.5% sulfate sulfur. Water soluble cadmium in the raw fume was 13.6% of the cadmium present, and water soluble zinc was 18.1% of the contained zinc. Ratio of water soluble cadmium/zinc was 0.23 to 1. The fume was rabbled progressively downward across the hearths in countercurrent relationship to uprising products of combustion from gas burners located on the bottom hearth and on the second-from-bottom hearth. The range of temperatures on the hearths was from 410–610° C., and the average temperature was 493° C. The product contained 2.5% sulfate sulfur and 8.58% cadmium. Of the total cadmium in the product, 60.1% was water soluble while the amount of water soluble zinc in the product was 0.4%. Ratio of water soluble cadmium/zinc was 25.1 to 1.

*Example II*

13 tons per day of sinter plant Cottrell fume was fed to the furnace wherein the range of temperatures on the hearths was from 420–520° C., with an average temperature of 468° C. The amount of sulfate sulfur in the product was 1.5%; and the amount of cadmium, 6.6%. Of the total cadmium in the product, 85.2% was water soluble; while the product contained only 0.4% water soluble zinc. Ratio of water soluble cadmium/zinc was 23.2 to 1.

*Example III*

The Cottrell fume was fed at the rate of 19 tons per day. The range of hearth temperatures was 360–450° C., with an average temperature in the furnace of 412° C. The product contained 2.9% sulfate sulfur and 7.5% cadmium. Of this cadmium, 91.7% was water soluble; while the product contained 2.5% water soluble zinc. Ratio of water soluble cadmium/zinc was 5.9 to 1.

*Example IV*

The Cottrell fume was fed at the rate of 18.2 tons per day. The range of hearth temperatures was 320–460° C., with an average temperature of 405° C. The product contained 2.7% sulfate sulfur and 10.4% cadmium. Of the cadmium, 84.7% was water soluble; and the product contained 0.9% water soluble zinc. Ratio of water soluble cadmium/zinc was 23.2 to 1.

*Example V*

The cadmium is extracted from the heat treated fume by leaching with water. For example, this may be effected by feeding heat treated fume and water to a wet ball mill, allowing the resulting slurry to settle in a clarification tank, and decanting off the cadmium sulfate solution thus obtained. Heat treated fume with a composition of 16.0% lead, 9.6% cadmium, 43.0% zinc, 5.4% iron, 0.58% arsenic, 3.1% total sulfur, and 3.0% sulfate sulfur was fed at the rate of 30 tons per day to a wet 18" x 6' ball mill. Water was fed concurrently to the ball mill at a rate of 11 gallons per minute. The resulting slurry was pumped to a clarification tank. Following settling of solids, requiring two hours, the solution was decanted. The solution had the following analysis:

| Zn, g./l. | Cd, g./l. | Fe, g./l. | As | Pb, g./l. |
|---|---|---|---|---|
| 2.4 | 34 | 0.02 | Nil | .05 |

The invention is not limited to the conditions described by way of example. It will be apparent to those skilled in the art that other conditions and methods of treatment may be employed without departing from the principles of the invention as defined in the claims hereof.

We claim:

1. Process for the recovery of cadmium as sulfate from bag house dust, Cottrell dust and like material containing a substantial portion of its cadmium content in the form of water-insoluble oxide compounds together with at least one metal sulfate of the group consisting of zinc sulfate and ferric sulfate in at least about equimolar proportion to the cadmium oxide content of the material, which comprises heating the material at a temperature of from about 400° C. to about 700° C. until at least a major portion of the cadmium oxide content of the material has reacted with said metal sulfates to convert the cadmium oxide to water-soluble cadmium sulfate and to convert said metal sulfates to water-insoluble oxidic compounds of said metals, and thereafter leaching the material to recover the cadmium sulfate therefrom.

2. Process as defined in claim 1 wherein said equimolar proportion of said metal sulfates is provided at least in part by admixing at least one of said metal sulfates with the material prior to said heating step.

3. Process as defined in claim 1 wherein said equimolar proportion of said metal sulfates is provided at least in part by admixing zinc sulfate with the material prior to said heating step.

4. Process for the recovery of cadmium as sulfate from bag house dust, Cottrell dust and like materials containing water-insoluble oxidic compounds of cadmium which comprises heating the material with zinc sulfate in at least about equimolar proportion to the cadmium oxide content of the material at a temperature of from about 400° C. to about 700° C. until at least a major proportion of the oxidic compounds of cadmium are converted to water-soluble cadmium sulfate and equimolar amounts of the zinc sulfate are converted to water-insoluble oxidic compounds of zinc and thereafter leaching the material to recover the cadmium sulfate therefrom.

5. Process for the recovery of cadmium as sulfate from metallurgical materials containing water-insoluble oxidic compounds of cadmium which comprises heating the material with zinc sulfate at a temperature of from about 400° C. to about 700° C. until a substantial amount of the oxidic compounds of cadmium are converted to water-soluble cadmium sulfate and equimolar amounts of the zinc sulfate are converted to water-insoluble oxidic compounds of zinc and thereafter leaching the materials to recover the cadmium sulfate therefrom.

6. Process for increasing the ratio of water-soluble cadmium compounds to water-soluble zinc compounds in metallurgical materials containing water-insoluble oxidic compounds of cadmium and zinc sulfate which comprises heating the material at a temperature of about 400° C. to about 700° C. whereby equimolar amounts of oxidic compounds of cadmium and of zinc sulfate are converted to water-soluble cadmium sulfate and water-insoluble oxide compounds of zinc, respectively.

References Cited in the file of this patent

UNITED STATES PATENTS

| 1,552,595 | Coolbaugh et al. | Sept. 8, 1925 |
| 1,779,841 | Fischer | Oct. 28, 1930 |
| 1,869,259 | Hughes | July 26, 1932 |
| 2,473,962 | McCutcheon | June 21, 1949 |

OTHER REFERENCES

Mellor: "Comprehensive Treatise on Inorganic and Theoretical Chemistry," Longmans, Green & Co., New York, 1923, vol. 4, page 613.